United States Patent

[11] 3,591,843

[72] Inventor Helmut Friedrich
Bremen, Germany
[21] Appl. No. 040,993
[22] Filed May 25, 1970
[45] Patented July 6, 1971
[73] Assignee Vereinigte Flugtechnische Werke-Fokker GmbH
Bremen, Germany
[32] Priority June 3, 1969
[33] Germany
[31] P 19 28 235.0

[54] DEVICE FOR STARTING ONE OR SEVERAL AIRCRAFT ENGINES AND FOR DRIVING ASSOCIATED AUXILIARY EQUIPMENT
6 Claims, 1 Drawing Fig.

[52] U.S. Cl. ............................................. 290/4 R
[51] Int. Cl. ...................................... F02n 15/02
[50] Field of Search ............................ 290/1, 4, 37

[56] References Cited
UNITED STATES PATENTS
2,223,703 12/1940 Potez ............................ 290/4
3,465,162 9/1969 Oprecht ...................... 290/4

*Primary Examiner*—Oris L. Rader
*Assistant Examiner*—W. E. Duncanson, Jr.
*Attorney*—Smyth, Roston and Pavitt

ABSTRACT: A starting aggregate for one or several aircraft engines is coupled to auxiliary equipment for such an engine via gear means; controlled transmission means couple the engine to the gear means to be drivingly connected to the aggregate and to the auxiliary equipment. The system is constructed that, in case the engine has ignited and runs at a higher speed it may drive the auxiliary equipment also at the higher speed and may decouple from the aggregate. Cross-coupling between plural engines permits starting of one engine by another as well as driving of all auxiliary equipment by the latter engine.

PATENTED JUL 6 1971  3,591,843
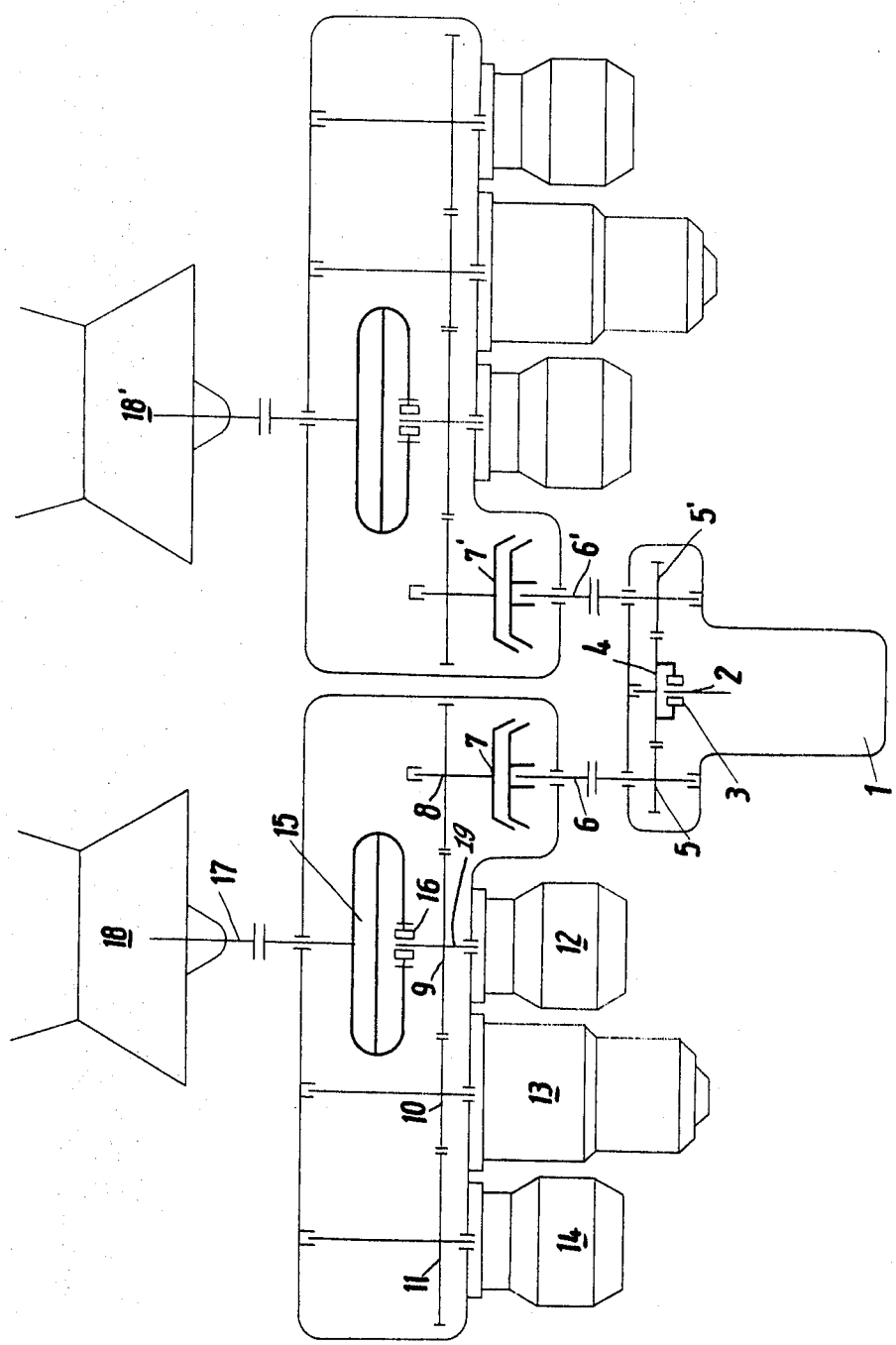
Inventor:
Helmut Friedrich

DEVICE FOR STARTING ONE OR SEVERAL AIRCRAFT ENGINES AND FOR DRIVING ASSOCIATED AUXILIARY EQUIPMENT

The present invention relates to a device for starting one or several aircraft engines and for driving auxiliary aircraft equipments, such as generators, hydraulic pumps etc.

Equipment of the type to which the invention pertains serve the purpose of starting aircraft engines independently from ground equipment. Also, the auxiliary equipment of the aircraft is to be tested and operated otherwise by means aboard. Known starting and driving equipment of this type is comprised of a starter aggregate operating a generator and driving a torque converter having its driven output connected to other auxiliary equipment of the aircraft as well as to the engine or engines thereof. In order to conduct function tests and to operate the auxiliary equipment without operating the engines, the latter must be made disconnectable from the remaining equipment. Claw couplings have been employed for selectively connecting or disconnecting the engine from the remaining equipment when the latter is to be driven by aggregate rather than by the engine. However, if, subsequently the engines are to be started, the auxiliary equipment has to be halted first, so that the coupling may engage, and then the entire device has to start up anew. Thereafter, function tests on the auxiliary equipment have to be repeated because of the halting, in order to determine true readiness of the aircraft.

The problem solved by the invention is to be seen in the avoidance of the aforementioned repetition of the function tests and to provide equipment that is economical and highly reliable.

The starting and driving equipment in accordance with the preferred embodiment of the present invention uses also a starting aggregate, which is connected directly to the auxiliary equipment on board of an aircraft, via gearing or the like, while the engine or engines is (are) coupled to both, aggregate and auxiliary equipment, through controlled transmission means such as a torque converter (one per engine), a coupling or the like.

The invention offers the particular advantage that the engine of the aircraft can be started even while the the auxiliary equipment for that engine runs and does not have to be halted. As it is only the engine that is driven via the controlled transmission, the latter may correspondingly be smaller dimensioned. Moreover, by virtue of excluding a claw clutch from the driving train a source of serious operational error has been eliminated.

It is another feature of the present invention to provide a speed dependent connection parallel to or as part of the controlled transmission and having characteristics of free wheeling operation, particularly as long as the starter aggregate is the prime mover. In case the aircraft engine has a higher speed than imparted upon it by the starter aggregate, the former takes over as prime mover for the auxiliary equipment. In case the auxiliary equipment is driven by the respective associated aircraft engine, this equipment is to be disconnected from the aggregate through another free wheeling type coupling-decoupling operation, also in dependence upon speed in the same relation.

In case of a multiengine aircraft, the auxiliary equipment, as respectively associated, with an engine, should remain operational even after the particular engine has dropped out. Also, the several engines and associated auxiliary equipment should be tested independently. Thus, it is an additional feature of the invention, to provide a single driven shaft for the aggregate, and the several engines with auxiliary equipment are connected in parallel to that shaft of the aggregate, but serially to each other, whereby each connection is disconnectable from the aggregate by a clutch.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically an example of the preferred embodiment of the invention, showing particularly two aircraft engines with associated auxiliary equipment and a single starter aggregate.

Proceeding now to the detailed description of the drawing, the FIGURE illustrates a starter aggregate 1 for a two engine system. The aggregate per se may be conventional and does not require elaboration. Aggregate 1 has a single driven output established by a shaft 2. A coupling element 3 provides free wheeling operation and connects shaft 2 to a gear 4, so that torque can be transmitted from shaft 2 to the gear. Gear 4 meshes with gears 5 and 5' which, in turn, drive respectively two starter shafts 6 and 6'.

As it can be seen, aggregate 1 via shaft 2 drives both, shaft 6 and 6' in parallel. On the other hand, shaft 6, for example, may drive shaft 6' via gear 4, whereby free wheeling transmission element 3 disconnects that particular driving train from shaft 2, in case gear 4, as so driven, rotates at a higher speed than it would if driven by shaft 2. Therefore, free wheeling transmission 3 permits speed dependent disconnection of either shaft 6 or 6' from the aggregate while being drivingly connected to each other in a serial driving train, from one shaft to the other.

Shaft 6 is connected to the driving input of a friction clutch 7, the driven output of which drives gear 8. Gear 8, in turn, drives a gear train comprised of meshing gears 9, 10 and 11. Each of these latter gears drives auxiliary shafts for operation of particular equipment. Thus, gear 9 is on shaft 19 for driving a hydraulic pump 12. Gear 10 is on a shaft for driving a generator 13. Gear 11 is on a shaft for driving another hydraulic pump 14. This auxiliary equipment is representative only; there may be additional equipment associated with the one particular engine, 18.

Shaft 19 of gear 9 operates additionally the driven input of a torque converter 15, there being a transmission element 16 interposed providing free wheeling during transmission of torque from shaft upon converter 15. In this particular embodiment is is presumed that device 15 is a hydrodynamic torque converter. The driven output 17 of converter 15 is drivingly connected to the respective associated aircraft engine 18.

The converter 15 and the particular transmission element 16 establish a controllable transmission means having the following characteristics. Through control of the converter 15 shaft 17 can selectively be driven by from and through shaft 19 via the torque converter. Torque transmission in that direction occurs during starting of engine 18. In case shaft 17 is driven by the engine and rotates at a speed higher than receiving via the converter from shaft 19 as driven by shaft 6 etc., transmission element 16 takes over and couples shaft 17 directly to shaft 19 for torque transmission in the reverse. Now, engine driven shaft 17 controls rotation of the gear train 9, 10 and 11, so that the particular auxiliary equipment 12, 13 and 14 is driven by the engine.

It can readily be seen that there is a similar arrangement for a second aircraft engine 18' and associated auxiliary equipment, coupled ultimately to the second output shaft 6'.

Upon starting aggregate 1 all of the auxiliary equipment, such as 12, 13, 14, are directly driven by the aggregate 1 and are, thus, operational. System tests can now be conducted in the usual manner. The driven input of the torque converter follows already that rotation, but idles. Coupling element 16 runs in the free wheeling mode. In order to start aircraft engine 18, oil is fed to torque converter 15, and now aggregate 1 will accelerate the engine up to its rated speed for starting, whereby the motive power for the engine is derived from shaft 19 via the converter. Therefore, the controlled transmission means couples the engine also to the driven auxiliary equip- After the engine has ignited, its rotational speed may exceed the speed as imparted upon it by the aggregate via the aforementioned drive train including the converter. Accordingly, the engine 18 takes over to drive the auxiliary equipment 12, 13 and 14, because the transmission element 16 bypasses the torque converter 15, for this reverse direction of torque transmission, and couples shaft 17 directly to shaft 19. Pursuant to this operation, gear 4 receives driving torque via gear 8, clutch 7, shaft 6 and gear 5, also tending to run faster than under motive power from aggregate 1. Thus, free wheeling transmission element 3 operatively disconnects the aggregate from the system.

Finally, the interpositioning of friction clutches (7 and 7') in the driven output path from each of the shafts 6, 6' permits testing of the engines 18 and 18' as well as the respectively associated auxiliary equipment in separate procedure. If, as before, engine 18 is started and its auxiliary equipment is run and tested, clutch 7' may be opened to inhibit rotation of the second auxiliary system.

It can readily be seen that one engine can actually be started by another one that already runs under exclusion of operation of the starter aggregate 1, merely via gear 4, with both clutches, 7 and 7', connected. In this case, one engine is used to drive its own auxiliary equipment as well as the auxiliary equipment of the other engine, under exclusion of aggregate 1.

The invention is not limited to the embodiments described above but all changes and modifications thereof not constituting departures from the spirit and scope of the invention are intended to be included.

I claim:

1. Equipment for starting at least one aircraft engine and for driving auxiliary equipment means such as a generator, hydraulic pumps etc., comprising:
   a starter aggregate having a driven output;
   a plurality of auxiliary equipment means each having a driving input;
   a driving train including gear means drivingly connecting the driven output of the aggregate to each of the driving inputs of the plurality of equipment means; and
   controlled transmission means connecting the gear means to the engine, for the engine to derive motive power from the aggregate via the gear means as driving the auxiliary equipment means of the plurality, and via the transmission means, permitting the engine to be selectively coupled to and decoupled from the gear means to cause driving of the auxiliary equipment means by the aggregate independent from driving the engine, while permitting driving of the auxiliary equipment means by the engine after ignition thereof.

2. Equipment as in claim 1, the controlled transmission means including a free wheeling connection for causing the auxiliary equipment means to be driven by the engine via at least a part of the gear means in case the engine tends to have higher speed after ignition than imparted upon it by the aggregate via the gear means and the controlled transmission means.

3. Equipment as in claim 1, a speed dependent, free wheeling connection included in the driving train to decouple the auxiliary equipment means from the aggregate in case, after ignition of the engine, the engine drives the auxiliary equipment means at a speed higher than imparted upon it by the aggregate via the gear means.

4. Equipment as in claim 1, there being a second engine, second auxiliary equipment means, a second driving train with gear means coupling the second auxiliary equipment to the driven output of the aggregate, and second controlled transmission means coupling the second engine to the second gear means, the first and second gear means operating in parallel on the driven output of the aggregate and serially to each other, there being friction clutches interposed in the first and second driving trains to separate the first and second auxiliary equipment means respectively from each other and selectively from the aggregate.

5. Equipment as in claim 1, the controlled transmission means including a torque converter having input coupled to the gear means and output coupled to the engine, further including free wheeling means connecting the output of the converter to the input, to provide free wheeling operation during starting of the engine, but coupling the engine directly to the input after engine ignition and in dependence upon the resulting engine speed.

6. Equipment as in claim 5, the driving train including free wheeling means decoupling the aggregate from the gear means as driving the auxiliary equipment means in case the engine drives the gear means at a higher speed than the aggregate.